(12) United States Patent
Vora et al.

(10) Patent No.: US 10,862,867 B2
(45) Date of Patent: Dec. 8, 2020

(54) INTELLIGENT GRAPHICAL USER INTERFACE

(71) Applicant: Cisco Technology, Inc., San Jose, CA (US)

(72) Inventors: Hiral Vora, Fremont, CA (US);
Hemanshu Narsana, Austin, TX (US);
Deepti Hemwani, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 41 days.

(21) Appl. No.: 15/942,529

(22) Filed: Apr. 1, 2018

(65) Prior Publication Data

US 2019/0306120 A1 Oct. 3, 2019

(51) Int. Cl.
| | | |
|---|---|---|
| G06F 3/0481 | (2013.01) | |
| H04L 29/06 | (2006.01) | |
| G06F 3/0484 | (2013.01) | |
| G06F 40/174 | (2020.01) | |

(52) U.S. Cl.
CPC ...... *H04L 63/0263* (2013.01); *G06F 3/04847* (2013.01); *G06F 40/174* (2020.01)

(58) Field of Classification Search
CPC . H04L 63/0263; H04L 63/20; H04L 63/0236; H04L 41/22; H04L 63/02; H04L 63/0218
See application file for complete search history.

(56) References Cited

U.S. PATENT DOCUMENTS

| | | |
|---|---|---|
| 5,625,763 A | 4/1997 | Cirne |
| 6,330,231 B1 | 12/2001 | Bi |
| 6,363,421 B2 | 3/2002 | Barker et al. |
| 6,415,164 B1 | 7/2002 | Blanchard et al. |
| 6,453,345 B2 | 9/2002 | Trcka et al. |
| 6,470,383 B1 | 10/2002 | Leshem et al. |
| 6,484,261 B1 | 11/2002 | Wiegel |
| 6,529,218 B2 | 3/2003 | Ogawa et al. |
| 7,027,052 B1 | 4/2006 | Thorn et al. |

(Continued)

FOREIGN PATENT DOCUMENTS

| | | |
|---|---|---|
| GB | 2 389 017 A | 11/2003 |
| JP | 2011-204656 | 10/2011 |
| WO | 2013049390 | 4/2013 |

OTHER PUBLICATIONS

"Attractive-jQuery-Circular-Countdown-Timer-Plugin-TimeCircles," Jan. 19, 2015, 1 page.

(Continued)

*Primary Examiner* — Namitha Pillai
(74) *Attorney, Agent, or Firm* — Polsinelli PC

(57) ABSTRACT

In one embodiment, a method, system, and apparatus is described for providing a graphical user interface (GUI) for a network security system. Data is stored for use by a hardware processor in a memory. The hardware processor executes a graphics engine. A GUI is output by the graphics engine, the GUI including a first portion of the GUI comprising a user entry field for receiving a user input for configuring behavior of a network security system, a second portion of the GUI, for displaying a translation of the user input in a tabular form, and a third portion of the GUI, for displaying a translation of the user input in a graphical form. Related methods, systems, and apparatus are also described.

20 Claims, 9 Drawing Sheets

(56) References Cited

U.S. PATENT DOCUMENTS

| | | |
|---|---|---|
| 7,036,087 B1 | 4/2006 | Odom |
| 7,043,702 B2 | 5/2006 | Chi et al. |
| 7,051,029 B1 | 5/2006 | Fayyad et al. |
| 7,603,373 B2 | 10/2009 | Error et al. |
| 7,644,365 B2 * | 1/2010 | Bhattacharya ...... H04L 63/1416 715/733 |
| 7,730,223 B1 | 6/2010 | Bavor et al. |
| 7,792,844 B2 | 9/2010 | Error et al. |
| 7,861,175 B2 | 12/2010 | Wormald et al. |
| 7,865,842 B2 * | 1/2011 | Forlenza ............... G06F 3/0237 715/758 |
| 7,921,459 B2 | 4/2011 | Houston et al. |
| 7,945,620 B2 | 5/2011 | Bou-Ghannam et al. |
| 7,958,189 B2 | 6/2011 | Bernstein |
| 8,006,198 B2 | 8/2011 | Okuma et al. |
| 8,037,421 B2 | 10/2011 | Scott et al. |
| 8,140,991 B2 | 3/2012 | Smith et al. |
| 8,245,297 B2 | 8/2012 | Lim |
| 8,325,626 B2 | 12/2012 | Tóth et al. |
| 8,380,359 B2 | 2/2013 | Duchene et al. |
| 8,396,874 B2 | 3/2013 | Shamma et al. |
| 8,402,384 B2 | 3/2013 | Scott |
| 8,417,513 B2 * | 4/2013 | Prompt ................... G06F 40/56 704/9 |
| 8,423,163 B2 | 4/2013 | Park |
| 8,429,562 B2 | 4/2013 | Gourdol et al. |
| 8,442,693 B2 | 5/2013 | Mirza et al. |
| 8,443,289 B2 | 5/2013 | Sahashi et al. |
| 8,448,076 B2 | 5/2013 | Hammack et al. |
| 8,601,375 B2 | 12/2013 | von Eicken et al. |
| 8,619,958 B2 | 12/2013 | Patisaul et al. |
| 8,650,492 B1 | 2/2014 | Mui et al. |
| 8,738,158 B2 | 5/2014 | Sims et al. |
| 8,762,475 B2 | 6/2014 | Cheung et al. |
| 8,839,404 B2 | 9/2014 | Li et al. |
| 8,850,344 B1 | 9/2014 | Rowlette |
| 8,868,736 B2 | 10/2014 | Bowler et al. |
| 8,958,318 B1 | 2/2015 | Hastwell et al. |
| 8,972,893 B2 | 3/2015 | Duncan et al. |
| 8,977,794 B2 | 3/2015 | Grohman et al. |
| 8,994,539 B2 | 3/2015 | Grohman et al. |
| 9,112,719 B2 | 8/2015 | Sasaki et al. |
| 9,185,002 B2 | 11/2015 | Sasaki et al. |
| 9,317,778 B2 | 4/2016 | Cordova-Diba et al. |
| 9,318,016 B2 | 4/2016 | Park |
| 9,354,798 B2 | 5/2016 | Sasaki et al. |
| 9,462,041 B1 | 10/2016 | Hagins et al. |
| 9,467,848 B1 | 10/2016 | Song et al. |
| 9,516,374 B2 | 12/2016 | Cormican et al. |
| 9,553,948 B2 | 1/2017 | Wong et al. |
| 9,584,853 B2 | 2/2017 | Frebourg et al. |
| 9,674,275 B1 | 6/2017 | Engers et al. |
| 9,686,581 B2 | 6/2017 | Cormican et al. |
| 9,733,983 B2 | 8/2017 | Kukreja et al. |
| 9,781,008 B1 | 10/2017 | Notari et al. |
| 9,900,224 B2 | 2/2018 | Dumitriu et al. |
| 9,985,837 B2 | 5/2018 | Rao et al. |
| 2001/0048373 A1 | 12/2001 | Sandelman |
| 2002/0049749 A1 | 4/2002 | Helgeson et al. |
| 2002/0087976 A1 | 7/2002 | Kaplan et al. |
| 2003/0035075 A1 | 2/2003 | Butler et al. |
| 2003/0229529 A1 | 12/2003 | Mui et al. |
| 2004/0010561 A1 | 1/2004 | Kim et al. |
| 2004/0034614 A1 | 2/2004 | Asher et al. |
| 2004/0041833 A1 | 3/2004 | Dikhit |
| 2004/0236774 A1 | 11/2004 | Baird et al. |
| 2005/0146534 A1 | 7/2005 | Fong et al. |
| 2006/0005228 A1 * | 1/2006 | Matsuda ............. H04L 63/0263 726/1 |
| 2006/0123393 A1 | 6/2006 | Atkins et al. |
| 2006/0129939 A1 | 6/2006 | Nelles et al. |
| 2007/0037563 A1 | 2/2007 | Yang et al. |
| 2007/0061486 A1 | 3/2007 | Trinh et al. |
| 2007/0226325 A1 | 9/2007 | Bawa et al. |
| 2007/0239854 A1 | 10/2007 | Janakiraman et al. |
| 2008/0045142 A1 | 2/2008 | Kim |
| 2008/0084888 A1 | 4/2008 | Yadav et al. |
| 2008/0101381 A1 | 5/2008 | Sun et al. |
| 2008/0126930 A1 | 5/2008 | Scott |
| 2008/0127057 A1 | 5/2008 | Costa et al. |
| 2008/0163207 A1 | 7/2008 | Reumann et al. |
| 2008/0165136 A1 | 7/2008 | Christie et al. |
| 2008/0168404 A1 | 7/2008 | Ording |
| 2008/0209005 A1 | 8/2008 | Akamatsu et al. |
| 2008/0219243 A1 | 9/2008 | Silverman |
| 2008/0307451 A1 | 12/2008 | Green |
| 2009/0044185 A1 | 2/2009 | Krivopaltsev |
| 2009/0113331 A1 | 4/2009 | Smith et al. |
| 2009/0153288 A1 | 6/2009 | Hope et al. |
| 2009/0307485 A1 | 12/2009 | Weniger et al. |
| 2010/0023865 A1 | 1/2010 | Fulker et al. |
| 2010/0031202 A1 | 2/2010 | Morris et al. |
| 2010/0033422 A1 | 2/2010 | Mucignat et al. |
| 2010/0169755 A1 | 7/2010 | Zafar et al. |
| 2010/0174583 A1 | 7/2010 | Passova et al. |
| 2010/0188328 A1 | 7/2010 | Dodge et al. |
| 2010/0218211 A1 | 8/2010 | Herigstad et al. |
| 2010/0262477 A1 | 10/2010 | Hillerbrand et al. |
| 2010/0275139 A1 | 10/2010 | Hammack et al. |
| 2010/0280637 A1 | 11/2010 | Cohn et al. |
| 2010/0333165 A1 | 12/2010 | Basak et al. |
| 2011/0030013 A1 | 2/2011 | Diaz Perez |
| 2011/0050594 A1 | 3/2011 | Kim et al. |
| 2011/0115741 A1 | 5/2011 | Lukas et al. |
| 2011/0142053 A1 | 6/2011 | Van Der Merwe et al. |
| 2011/0179388 A1 | 7/2011 | Fleizach et al. |
| 2011/0182295 A1 | 7/2011 | Singh et al. |
| 2011/0185303 A1 | 7/2011 | Katagi et al. |
| 2011/0191303 A1 | 8/2011 | Kaufman et al. |
| 2011/0193788 A1 | 8/2011 | King et al. |
| 2011/0202270 A1 | 8/2011 | Sharma et al. |
| 2011/0208541 A1 | 8/2011 | Wilson et al. |
| 2011/0209089 A1 | 8/2011 | Hinckley et al. |
| 2011/0209104 A1 | 8/2011 | Hinckley et al. |
| 2011/0221777 A1 | 9/2011 | Ke |
| 2011/0239142 A1 | 9/2011 | Steeves et al. |
| 2011/0264286 A1 | 10/2011 | Park |
| 2011/0289475 A1 | 11/2011 | Sukhenko et al. |
| 2012/0005609 A1 | 1/2012 | Ata et al. |
| 2012/0054367 A1 | 3/2012 | Ramakrishnan et al. |
| 2012/0140255 A1 | 6/2012 | Tanaka |
| 2012/0154138 A1 | 6/2012 | Cohn et al. |
| 2012/0154294 A1 | 6/2012 | Hinckley et al. |
| 2012/0185791 A1 | 7/2012 | Claussen et al. |
| 2012/0185913 A1 | 7/2012 | Martinez et al. |
| 2012/0192111 A1 | 7/2012 | Hsu et al. |
| 2012/0210349 A1 | 8/2012 | Campana et al. |
| 2012/0235921 A1 | 9/2012 | Laubach |
| 2012/0278727 A1 | 11/2012 | Ananthakrishnan et al. |
| 2012/0290940 A1 | 11/2012 | Quine |
| 2012/0291068 A1 | 11/2012 | Khushoo et al. |
| 2012/0324035 A1 | 12/2012 | Cantu et al. |
| 2013/0021281 A1 | 1/2013 | Tse et al. |
| 2013/0024799 A1 | 1/2013 | Fadell et al. |
| 2013/0047125 A1 | 2/2013 | Kangas et al. |
| 2013/0069969 A1 | 3/2013 | Chang et al. |
| 2013/0124523 A1 | 5/2013 | Rogers et al. |
| 2013/0145008 A1 | 6/2013 | Kannan et al. |
| 2013/0145307 A1 | 6/2013 | Kawasaki |
| 2013/0152017 A1 | 6/2013 | Song et al. |
| 2013/0155906 A1 | 6/2013 | Nachum et al. |
| 2013/0159898 A1 | 6/2013 | Knospe et al. |
| 2013/0174191 A1 | 7/2013 | Thompson, Jr. et al. |
| 2013/0179842 A1 | 7/2013 | Deleris et al. |
| 2013/0201215 A1 | 8/2013 | Martellaro et al. |
| 2013/0212287 A1 | 8/2013 | Chappelle et al. |
| 2013/0218987 A1 | 8/2013 | Chudge et al. |
| 2013/0265905 A1 | 10/2013 | Filsfils |
| 2013/0290783 A1 | 10/2013 | Bowler et al. |
| 2013/0322438 A1 | 12/2013 | Gospodarek et al. |
| 2013/0322848 A1 | 12/2013 | Li |
| 2013/0326583 A1 | 12/2013 | Freihold et al. |
| 2013/0342637 A1 | 12/2013 | Felkai et al. |
| 2013/0347018 A1 | 12/2013 | Limp et al. |

(56) References Cited

U.S. PATENT DOCUMENTS

| | | |
|---|---|---|
| 2014/0002580 A1 | 1/2014 | Bear et al. |
| 2014/0007089 A1 | 1/2014 | Bosch et al. |
| 2014/0013271 A1 | 1/2014 | Moore et al. |
| 2014/0016926 A1 | 1/2014 | Soto et al. |
| 2014/0023348 A1 | 1/2014 | O'Kelly et al. |
| 2014/0025770 A1 | 1/2014 | Warfield et al. |
| 2014/0033040 A1 | 1/2014 | Thomas et al. |
| 2014/0040784 A1 | 2/2014 | Behforooz et al. |
| 2014/0089992 A1 | 3/2014 | Varoglu et al. |
| 2014/0105213 A1 | 4/2014 | A K et al. |
| 2014/0108614 A1 | 4/2014 | Gunderson et al. |
| 2014/0108985 A1 | 4/2014 | Scott et al. |
| 2014/0130035 A1 | 5/2014 | Desai et al. |
| 2014/0132594 A1 | 5/2014 | Gharpure et al. |
| 2014/0176479 A1 | 6/2014 | Wardenaar |
| 2014/0181718 A1 | 6/2014 | Gao et al. |
| 2014/0198808 A1 | 7/2014 | Zhou |
| 2014/0201642 A1 | 7/2014 | Vicat-Blanc |
| 2014/0201681 A1 | 7/2014 | Mahaffey et al. |
| 2014/0269321 A1 | 9/2014 | Kamble et al. |
| 2014/0278590 A1 | 9/2014 | Abbassi et al. |
| 2014/0280133 A1 | 9/2014 | Dulitz |
| 2014/0281012 A1 | 9/2014 | Troxler et al. |
| 2014/0282213 A1 | 9/2014 | Musa et al. |
| 2014/0298210 A1 | 10/2014 | Park et al. |
| 2014/0310623 A1 | 10/2014 | O'Connell, Jr. et al. |
| 2014/0320387 A1 | 10/2014 | Eriksson et al. |
| 2014/0337824 A1 | 11/2014 | St. John et al. |
| 2014/0373064 A1 | 12/2014 | Ray |
| 2015/0006296 A1 | 1/2015 | Gupta et al. |
| 2015/0012881 A1 | 1/2015 | Song et al. |
| 2015/0019991 A1 | 1/2015 | Kristjansson |
| 2015/0030024 A1 | 1/2015 | Venkataswami et al. |
| 2015/0032272 A1 | 1/2015 | Neesen et al. |
| 2015/0043581 A1 | 2/2015 | Devireddy et al. |
| 2015/0058314 A1 | 2/2015 | Leclerc et al. |
| 2015/0074735 A1 | 3/2015 | Herigstad et al. |
| 2015/0081701 A1 | 3/2015 | Lerios et al. |
| 2015/0096011 A1 | 4/2015 | Watt |
| 2015/0113412 A1 | 4/2015 | Peyton et al. |
| 2015/0121436 A1 | 4/2015 | Rango et al. |
| 2015/0128046 A1 | 5/2015 | Cormican et al. |
| 2015/0128050 A1 | 5/2015 | Cormican et al. |
| 2015/0163192 A1 | 6/2015 | Jain et al. |
| 2015/0169208 A1 | 6/2015 | Cho |
| 2015/0193549 A1 | 7/2015 | Frye et al. |
| 2015/0212717 A1 | 7/2015 | Nair et al. |
| 2015/0350448 A1 | 12/2015 | Coffman et al. |
| 2016/0034051 A1 | 2/2016 | Xi et al. |
| 2016/0063954 A1 | 3/2016 | Ryu |
| 2016/0154575 A1 | 6/2016 | Xie et al. |
| 2016/0202879 A1 | 7/2016 | Chen et al. |
| 2016/0217113 A1 | 7/2016 | Bartle et al. |
| 2016/0253046 A1 | 9/2016 | Garrison et al. |
| 2016/0266738 A1 | 9/2016 | Martello |
| 2016/0357829 A1 | 12/2016 | Fung et al. |
| 2016/0364085 A1 | 12/2016 | Henderson et al. |
| 2016/0381023 A1 | 12/2016 | Dulce et al. |
| 2017/0046175 A1 | 2/2017 | Murray et al. |
| 2017/0118308 A1 | 4/2017 | Vigeant et al. |
| 2017/0373935 A1 | 12/2017 | Subramanian et al. |
| 2018/0062876 A1 | 3/2018 | Iizawa et al. |
| 2018/0143868 A1 | 5/2018 | Johnston et al. |
| 2019/0253389 A1* | 8/2019 | Verma .................. H04W 12/08 |

OTHER PUBLICATIONS

Christian, Josh, "Four Images on One Screen!—Make Your Home Theater More Versatile," DSI Entertainment Systems, Inc., Sep. 2, 2010, 2 pages.

"Definition of together," Merriam-Webster, 2 pages.

DSI Entertainment Systems, "Creston control of a high-end custom home theater design in Los Angeles," youtube.com, Uploaded on Dec. 14, 2010.

"Flow diagram," http://en.wikipedia.org/wiki/Flow_diagram, retrieved on Jun. 11, 2015, 2 pages.

Galitz, Wilbert O., "The Essential Guide to User Interface Design," second edition, 2002, p. 477-478.

"Google Gesture Search," Goggle, Jun. 21, 2013.

"Introducing the new Sky+ app for iPad," Sky.com, 2 pages.

Mui, Phil, "Introducing Flow Visualization: visualizing visitor flow," Google Analytics Blog, Oct. 19, 2011, 6 pages.

Neeman, Patrick, "Goggle Is Missing Social and Their Culture May Be to Blame," Jun. 12, 2013, 9 pages.

Residential Systems, Inc "ISE 2014: Savant Systems Displays SmartView Video Tiling Interface," youtube.com, published Feb. 6, 2014.

Residential Systems, Inc., "Savant Video Tiling from Residential Systems, Inc.," youtube.com, posted Dec. 26, 2013.

"SmartView Tiling User Guide," Savant Systems LLC, Jan. 2014, pp. 1-25.

"Suggestion: Browser "new tab"—cover gesture to include bookmarks," Feb. 11, 2014.

The Lync Insider, "The "Inside" Perspective on Skype for Business Server 2015, Lync Server 2012, VOIP and UNIFIE . . . " Jun. 8, 2015, 23 pages.

"Tweetbot for MAC," http://tapbots.com/tweetbot/mac/ retrieved Jun. 8, 2015, 3 pages.

Wagner, Kyle, "The OS X Lion Survival Guide," Jul. 21, 2011, 7 pages.

Wikipedia, "Sankey Diagram," Jun. 11, 2015, 2 pages.

"Y! Multi messenger 2.0.0.100," last update Sep. 10, 2013, http://y-multi-messenger.soft32.com.

"Zeebox is your TV sidekick," Zeebox.com, 2012.

GitHub-Tejas-raine-CLI-for-RYU-Firewall viewed Nov. 2017; available on the web at: https://github.com/tejas-rane/CLI-for-RYU-Firewall.

ArubaNetworks; AppRF; viewed Nov. 2017.

FWBuilder.org; Introduction to Firewall Builder viewed Nov. 2017; available on the web at: http://www.fwbuilder.org/4.0/screenshots.shtml.

McNamara, Katherine; "Firepower Setup and Policy Creation" available on the web at: http://www.network-node.com/blog/2016/8/12/firepower-basic-setup.

Pozo, S. et al., "AFPL2, an Abstract Language for Firewall ACLs with NAT Support"; in 2009 Second International Conference on Dependabilty, Athens, Glylada, 2009, pp. 52-59.

Billing, Emily, "Show or hide controls with Rules in Nintex Forms," Version 5, May 25, 2014, 21 pages.

Chemaxon, "Structure Checker," retrieved Sep. 7, 2016 at http://idtarget.rcas.sinica.edu.tw/marvin/help/structurechecker/structurechecker.html 8 pages.

Microsoft Office, "PowerPoint 2013," Quick Start Guide, 2013, 9 pages.

National Aeronautics and Space Administration, "GMAT User Guide R2015a," general mission analysis tool, 2015, part 1 of 4, 368 pages.

National Aeronautics and Space Administration, "GMAT User Guide R2015a," general mission analysis tool, 2015, part 2 of 4, 387 pages.

National Aeronautics and Space Administration, "GMAT User Guide R2015a," general mission analysis tool, 2015, part 3 of 4, 175 pages.

National Aeronautics and Space Administration, "GMAT User Guide R2015a," general mission analysis tool, 2015, part 4 of 4, 100 pages.

SAP, "Creating a Catalog," 2014, 4 pages.

SAP, "Creating a Rule Set," 2014, 4 pages.

Vince, Clear is a iOS to-do app that has the best UI I've seen in a while [Video], Jan. 27, 2012, 15 pages.

Winegar, Mark, "Numbers: adding rows," Dec. 28, 2012, 4 pages.

Zugec, Ivan, "Create Custom Visibility Rules in Panels Using Ctools Access Plugins," Aug. 13, 2015, 12 pages.

Author Unknown, "Sorting Your Chat List," available at https://support.google.com/chat/answer/161035?hl=en, retrieved on Jan. 1, 2014, 2 pages.

(56) References Cited

OTHER PUBLICATIONS

Author Unknown, "User Interface—Changing Icon Appearance Based on Frequency of Use (Samsung)—Patent Application—Prior Art Request," available at http://patents.stackexchange.com/questions/4233/user-interface-changing-_icon-appearance-based-on-frequency-of-use-samsung Jul. 26, 2013, 9 pages.
Author Unknown, "Using the Tile View," Visokio, 2013, 3 pages.
Constine, Josh, "Facebook's Relevance-Filtered Chat buddy List, or, Why Users Don't Know Who's Online," Aug. 8, 2011, 9 pages.
Yu, Toby, "Resizable Contacts Widget Pro," Oct. 7, 2013, 3 pages.

\* cited by examiner

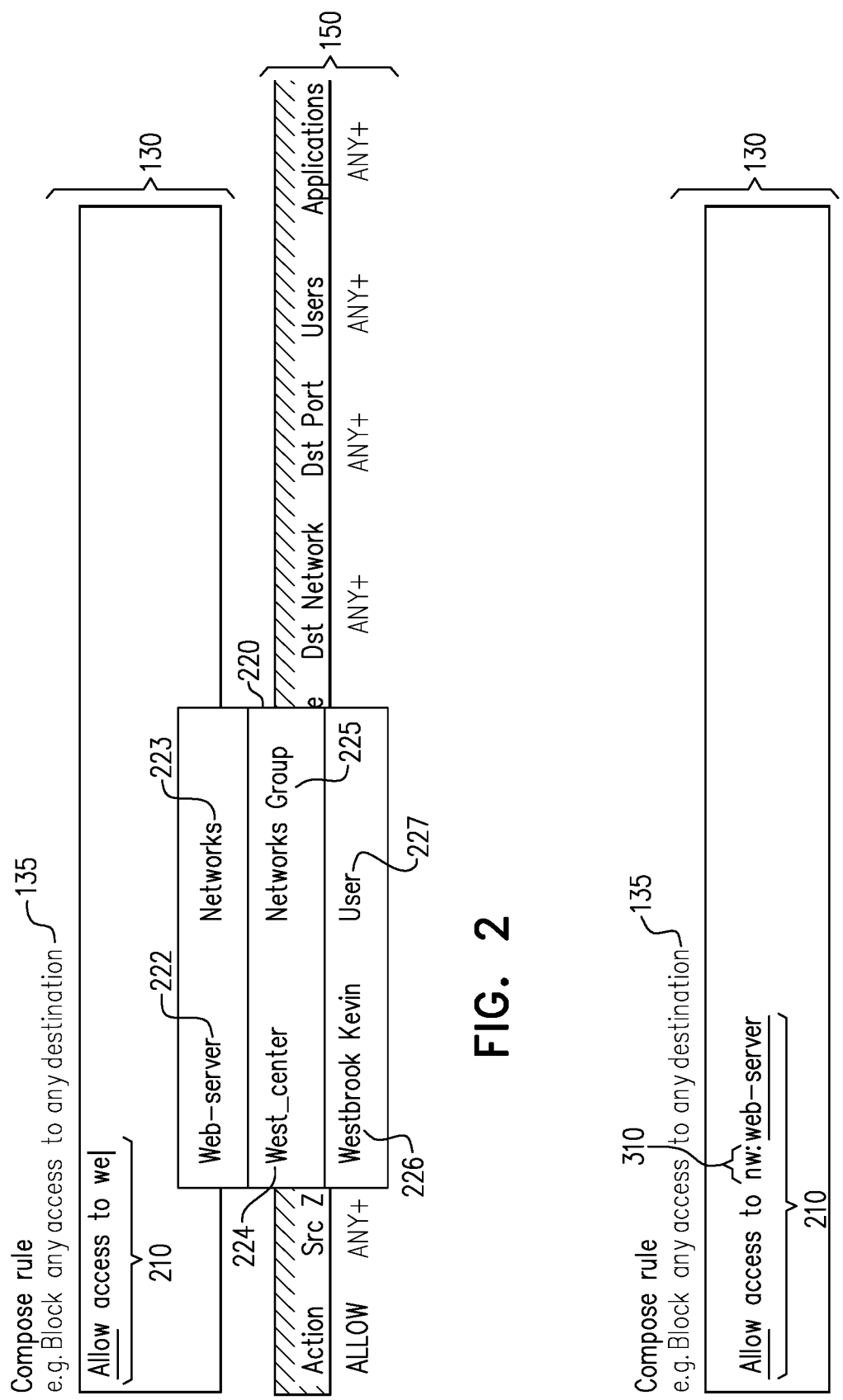

INTELLIGENT GRAPHICAL USER INTERFACE

TECHNICAL FIELD

The present disclosure generally relates to intelligent graphical user interfaces.

BACKGROUND

A graphical user interface (GUI) is a type of user interface that allows users to interact with an electronic device by using graphical elements, such as icons and other visual indicators, instead of using a text-based interface, such as a command line interface. The actions in a GUI are usually performed through direct manipulation of the graphical elements.

BRIEF DESCRIPTION OF THE DRAWINGS

The present disclosure will be understood and appreciated more fully from the following detailed description, taken in conjunction with the drawings in which:

FIG. 2 is an illustration depicting a change to the GUI of FIG. 1A providing in response to a user input in accordance with various implementations;

FIG. 3 is an illustration of a fully populated user entry field of the GUI for the NGWF of FIG. 1A in accordance with various implementations;

DESCRIPTION OF EXAMPLE EMBODIMENTS

Overview

Figure 1A:
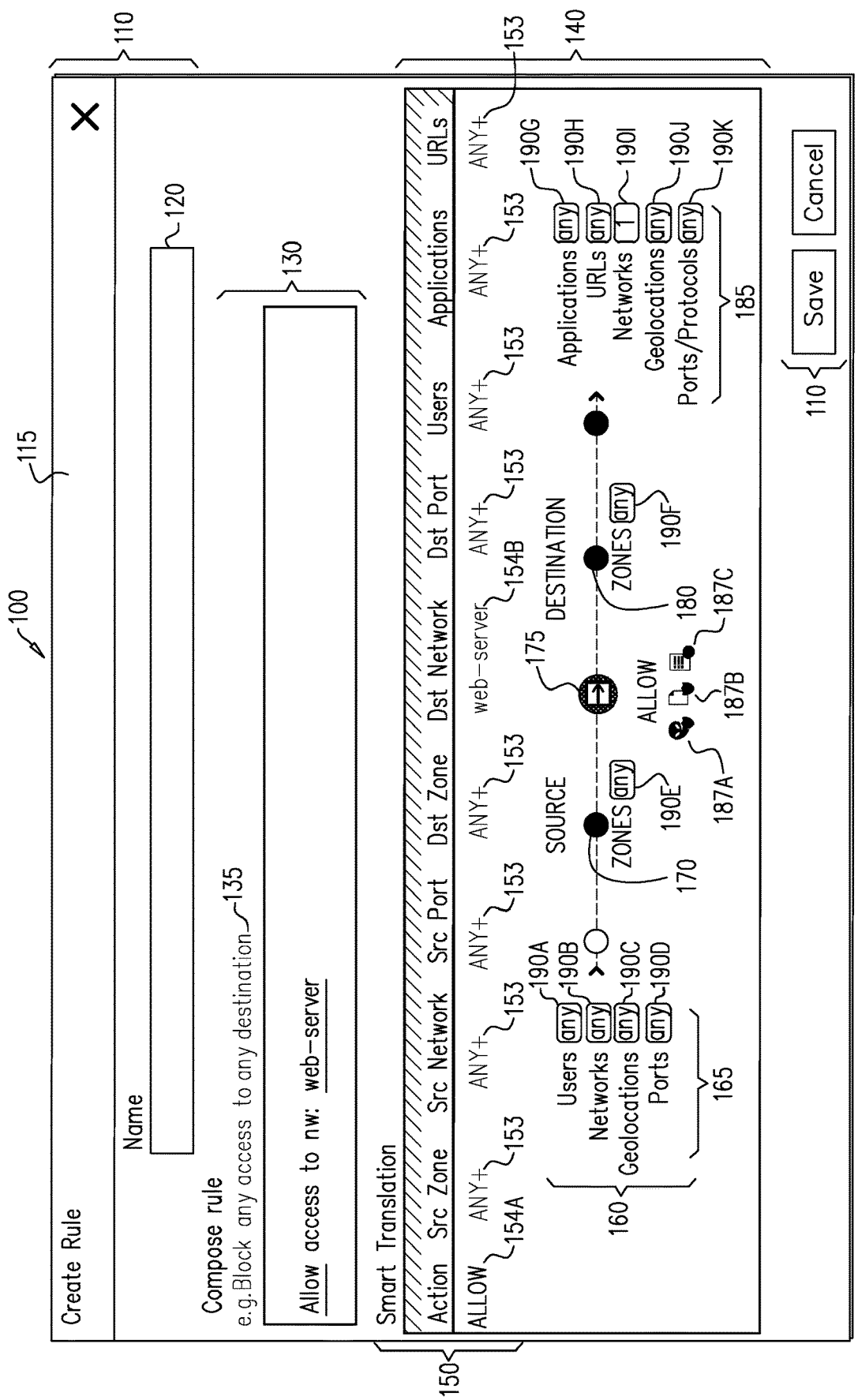
FIG. 1A is an illustration of a first embodiment of a graphical user interface (GUI) for next generation firewalls (NGFWs)) in accordance with various implements.

In one embodiment, a method, system, and apparatus is described for providing a graphical user interface (GUI) for a network security system. Data is stored for use by a hardware processor in a memory. The hardware processor executes a graphics engine. A GUI is output by the graphics engine, the GUI including a first portion of the GUI comprising a user entry field for receiving a user input for configuring behavior of a network security system, a second portion of the GUI, for displaying a translation of the user input in a tabular form, and a third portion of the GUI, for displaying a translation of the user input in a graphical form. Related methods, systems, and apparatus are also described.

EXEMPLARY EMBODIMENTS

A network security device may perform one or more security functions on a network, including, but not limited to, one or more of: the functions of a traditional firewall, including as packet filtering, network address translation (NAT) and port address translation (PAT), stateful inspection, and virtual private network (VPN) support; deep packet inspection; intrusion prevention; TLS/SSL (Transport Layer Security/Secure Sockets Layer) encrypted packet inspection; website filtering; bandwidth management; and anti-virus inspection. Such a network security device may operate on many of the layers of the Open Systems Interconnection (OSI) model in order to provide improved filtering of network traffic that is dependent on the packet contents. In the present disclosure, such a network security device will be referred to, for the sake of convenience, as a Next Generation Firewall (NGFW). However, this disclosure is not limited to a NGFW. It is also apprecaited that the network security device may be implemented in either hardware, software, or a combination thereof.

Next-generation firewalls (NGFWs) have the potential to implement rules governing inspection of traffic passing through the NGFW in many different ways. The advancement in these capabilities increases the number of attributes an administrator can configure per rule. There is a man-machine interface issue created, however, as how the administrator thinks and processes rule creation often diverges from how the rule is actually configured in the NGFW user interface. The administrator often has a need to orient him- or herself to map the desired goal of creating the exact rule with filling out correct information into the correct field.

In typical NGFW device user interfaces, an administrator typically needs to translate security goals into the configuration method offered by a user interface. Often this involves the administrator entering various pieces of information into different input fields of the user interface. When entering information using a graphical user interface (GUI), information sometimes may be entered on different tabs of the GUI. This may complicate creation of a NGFW access control rule. Information to be entered into the GUI may include: information about source of packets; information about destination of packets; universal resource locator (URL) filtering information; application visibility control (i.e., firewall-based protection against application-level threats), and so forth. The administrator wants to be confident that a security goal is achieved when creating a new access rule. The administrator is unable to view of the access rule's parameters on a single screen, row, or column.

In practice, however, the administrator often has to switch between multiple views in order to input security information and other types of information in order to create the access control rule. The administrator often has to switch views repeatedly, entailing multiple clicks, in order to make sure that information is correctly copied into a proper input field. There is then a need to ensure that a security goal is properly translated into the access rule once the access rule is created. Overall, a large amount of time on the part of the administrator is required in order to create acceptable access rules. Furthermore, there is often a need on the part of the administrator to deconstruct security and/or business requirements into elements that fit into fields of the GUI. It is noted that the present disclosure describes an intelligent GUI in terms of its use in an NGFW. However, persons of skill in the art will appreciate that the principles disclosed herein for the intelligent GUI for the NGFW may be easily adapted to be used as an intelligent GUI for other networking hardware or any other application, hardware or software for which a GUI might be appropriate. While the term "administrator" is used herein, it should be understood that in a more general sense, the term "user" may be used instead of an "administrator" for applications of the intelligent GUI in devices other than networking equipment.

Reference is now made to FIG. 1A, which is a simplified pictorial illustration of a first embodiment of a GUI 100 for NGFWs constructed and operative in accordance with an embodiment of the present disclosure. The GUI 100 comprises an "administrative" portion 110 located, in part, at the top of the GUI 100 and in part, at the bottom of the GUI 100. The administrative portion 110 located at the top of the GUI 100 comprises a window title bar 115, which provides a name for a window ("Create Rule" in the present example) and a "Name" field 120 that enables the administrator to provide a name for the rule which is created using the GUI 100. Save and Cancel buttons, comprising the administrative portion 110 located at the bottom of the GUI 100 are provided for operations of saving a rule when it is created using the GUI 100. Alternatively, the GUI 100 window may be closed using the cancel button without saving any changes. Other standard buttons as are known in the art may also be provided on the GUI 100 window.

A user entry field 130 enables the administrator to enter the rule for the NGFW. In the present example, for instance, the rule depicted in the user entry field 130 is: "Allow access to nw: web-server". This exemplary rule will be described below in greater detail. It is appreciated, however, that a rule may be entered into the user entry field 130 in a natural language and, provided that databases of the NGFW recognize the network elements referred to in the rule, and appropriate keywords are used in formulating the rule (as will be described below), the GUI 100 will translate and display the rule as a rule for an NGFW, as explained in detail below. An example 135 of a rule which may be entered may be provided in the GUI 100. For instance, in FIG. 1A, the example 135 appears as, "e.g. Block any access to any destination". Other examples may be provided, such as, for instance, "Allow any access to any destination", and so forth (not shown).

A "Smart Translation" portion 140 of the GUI 100 is depicted beneath the user entry field 130. The smart translation portion 140 of the GUI 100 comprises two sections. A first section of the smart translation portion 140 provides a tabular view 150, comprising a translation of the rule the administrator entered into the user entry field 130, displaying, as a table, parameters of the NGFW, showing which parameters of the NGFW are affected by the rule the administrator entered into the user entry field 130. As is known in the art, fields of the GUI 100 will typically update as the user presses an enter key, or otherwise switches focus to another field in the GUI 100. In some embodiments, fields of the GUI 100 may be updated as the user types words into the user entry field 130.

In some embodiments of the GUI 100, once the rule appears in the tabular view 150 the administrator may update, change, or otherwise edit the rule by modifying a field in the tabular view 150, as will be explained below in greater detail. By way of example, a "+" sign 153 (a plus sign) or other appropriate graphical element (e.g., an inverted triangle, ▼) may enable opening a drop down menu (not depicted) allowing the rule to be updated, changed, or edited.

As was discussed above, the user entered the rule, "Allow access to nw: web-server" in the user entry field 130. This appears in the smart translation tabular view 150 as ALLOW 154A in the Action Tab and as web-server 154B in the "DST Network" (destination network) Tab.

A second section of the smart translation portion 140 provides a graphical view 160 comprising a translation of the rule the administrator entered into the user entry field 130, graphically displaying parameters of the NGFW, showing which parameters of the NGFW are affected by the rule the administrator entered into the user entry field 130.

The graphical view 160 in the present example is now briefly explained. The graphical view 160 is "read" in the present example from left-to-right. It is appreciated that this left-to-right feature may be a function of an input language used for input to the user entry field 130. In implementations where the user entry field 130 receives input in a language ordinarily written from right-to-left, then the graphical view 160 may also be "read" from right-to-left. Alternatively, the user input language may be written from right-to-left, and the graphical view 160 may also be "read" from left-to-right, or vice-versa.

For the purpose of the present discussion, the NGFW may be thought of as a virtual wall surrounding a network. The presence of the virtual wall divides the network or networks inside of the NGFW from the network or networks outside of the NGFW. The extreme left of the graphical view 160 depicts various elements 165 which are part of at least one source security zone inside of the NGFW. Persons of skill in the art will appreciate that security zones are a logical way to group physical and virtual interfaces on the NGFW in order to control and log traffic that traverses (through these interfaces) on the network or networks controlled by the NGFW.

Figure 1B:
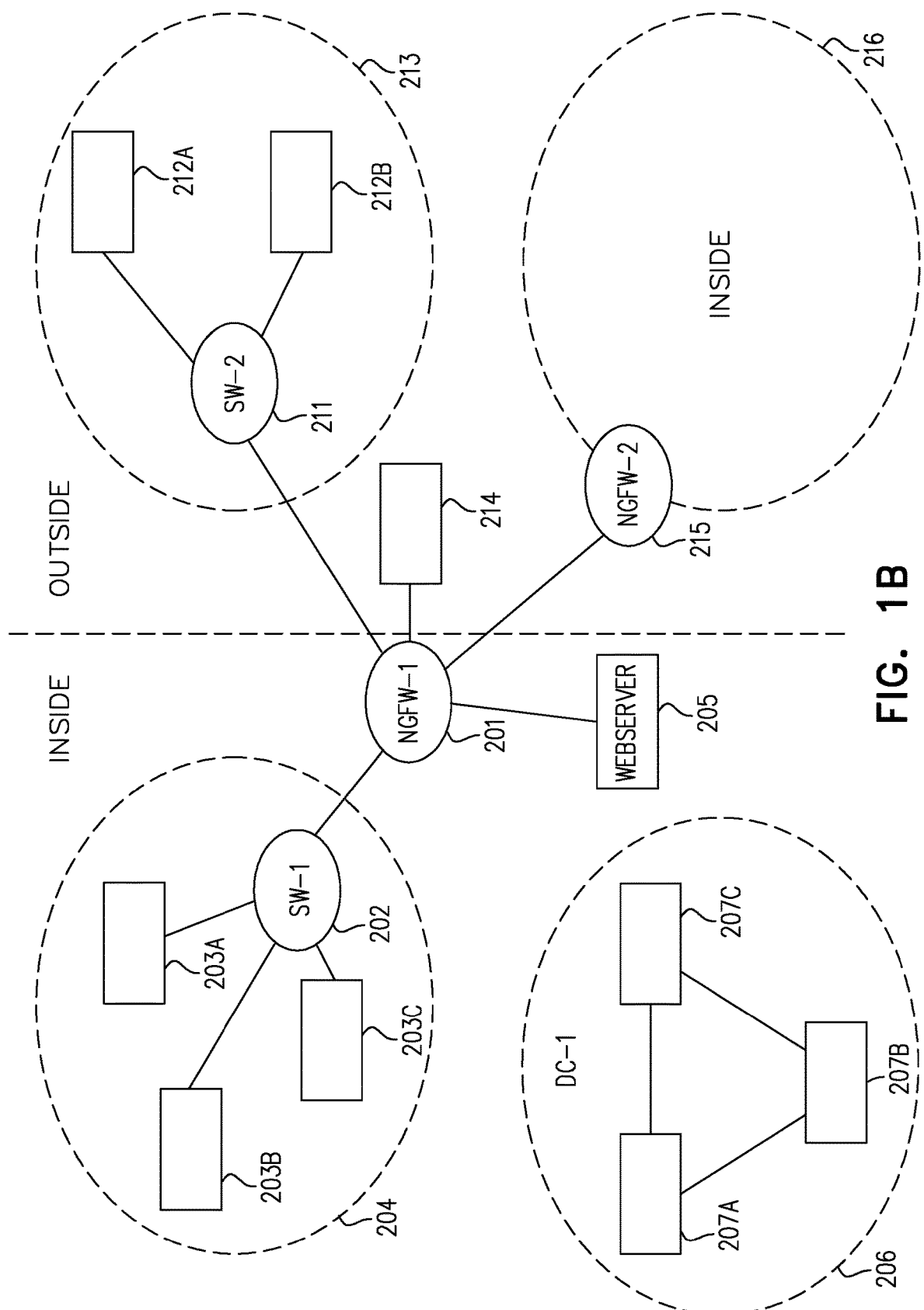
FIG. 1B is an illustration of a network in which at least one instance of the NGFW of FIG. 1A is implemented.

Reference is now briefly made to FIG. 1B, which is an illustration of a network in which at least one instance of the NGFW of FIG. 1A is implemented. The NGFW discussed herein, depicted in FIG. 1B as NGFW-1 201, may be connected to a first network node, switch SW-1 202. The switch SW-1 202 itself might be a switch in a local area network (LAN) and is itself in communication with a variety of other network elements, such as computers 203A, 203B, and 203C. The LAN 204 might be a first security zone. A second security zone 206 might be a data center, DA-1, in which several servers comprising massive storage devices 207A, 207B, and 207C. A webserver 205 might be directly connected to NGFW-1 201. All of these network nodes, elements, and security zones, are considered, for the sake of illustration, as "inside" the firewall NGFW-1 201. Three security zones are depicted as being "outside" of the firewall NGFW-1 201. A first of these might be a second LAN 213, having a second switch, SW-2 211, connected to two computers 212A and 212B. A mobile device 214 might be attempting to connect to the webserver 205 from outside the firewall NGFW-1 201. Lastly, a second firewall NGFW-2 215 might have its own domain 216. The domain 216 is considered inside the second firewall NGFW-2 215, but outside the firewall NGFW-1 201.

Returning now to the discussion of FIG. 1A, the various elements 165 include users, networks, geolocations and ports. The next graphical element shown is a first filled circle 170 indicating, in the present example, any source zone. A next graphical element representing the NGFW action "allow" 175 then appears. A second filled circle 180 then is shown, indicating, in the present example, any destination zone. Finally, a list of allowed elements 185 appears, including, applications, URLs, networks, geolocations, and ports or protocols, appears.

Three icons 187A-C are depicted beneath the graphical element representing the NGFW action "allow" 175. The first icon 187A may indicate that the rule shown in the user entry field 130 invokes an intrusion profile (i.e. is active to detect particular types of incoming intrusions). The second icon 187B may indicate that the rule shown in the user entry field 130 invokes a malware profile (i.e. is active to detect particular types of incoming malware). The third icon 187C may indicate that the rule shown in the user entry field 130 invokes logging (i.e. the NGFW logs incidents in which the rule is invoked).

As depicted in the example of FIG. 1A, the graphical view 160 indicates that any of the users, in any of the networks, in any geolocation, over any port inside any security zone within the NGFW is allowed to access any application, URL, or network, in any geolocation, at any port, using any protocol, in any destination security zone. This expanded explanation of the graphical view 160 maps directly back to the "Allow access to nw: web-server" entered in the user entry field 130.

Certain elements in the GUI 100 such as, for example, the various elements 165, the first filled circle 170, the second filled circle 180, and the list of allowed elements 185 are accompanied by a legend 190A-190K. The legend indicates that either any of the various elements 165, the first filled circle 170, the second filled circle 180, and the list of allowed elements 185 may be included in the rule (e.g., any network is allowed, in the rule depicted, to access any URL). By way of example, in FIG. 1A, the rule in the user field 130 may be "read" from the graphical view 160, by looking at the various elements 165, their respective legends 190A-190D, other information about the source side (i.e.: any 190A users, any 190B, . . . any 190D ports from any 190E zone at the source), the NGFW action ("allow" 175), the destination information (i.e. any 190F zones 180 to of the list of allowed elements 185 (e.g., any 190G application, any 190H URLs, one (1) 190I network (i.e., web-server), in any 190J geolocation, and to any 190K ports/protocols).

Creation of the rule depicted in FIG. 1A is now described, with reference to FIGS. 2 and 3. Reference is now made to FIGS. 2-3. FIG. 2 is a simplified pictorial illustration of a suggestion offered as the administrator uses the user entry field 130 of FIG. 1A. FIG. 3 is a simplified pictorial illustration of a fully populated user entry field 130 of the GUI 100 for the NGWF of FIG. 1A. Creation of the rule begins as the administrator begins to enter text in the user entry field 130. In the present example, in FIG. 2, the administrator has entered the text "Allow access to we" 210. It is noted that the word "Allow" is depicted as underlined. Allow is one of a number of verbs that is recognized by the GUI 100. Other verbs may include, for example, Permit, Block Deny, Authorize, Enable, and/or the like. As will be seen below, with reference to FIG. 5, "Allow" appears in one field of the tabular view 150 (e.g., "ALLOW" appears under the "Action" header), and this is indicated by the underlining.

As the administrator continues to type, "Allow access to we" 210, and specifically, the text "we", an over-lay menu 220 appears. The over-lay menu 220 offers a menu of possible choices of possible which are already known in the various databases accessible by the NGFW which might make syntactical sense in the sentence the administrator is entering in the user entry field 130. In one example, the administrator has provided a verb in the user entry field 130, so a noun is called for as a possible choice in the over-lay menu 220. Typically, the GUI 100 will, at states where a user is entering information, offer a suggestion based on items known in the various databases accessible by the NGFW. The user may select one of the suggested words, or alternatively, can continue to type, completing the word. If the word does not map with an entry in the various databases accessible by the NGFW, then the GUI 100 will relate to the word as a text string, and not as an object in one of the databases. As depicted in FIG. 2, three choices are offered: Web-server 222, West_center 224, and Westbrook Kevin 226. The offered choices are shown with a label corresponding to one of the columns of the table seen in the tabular view 150, as will be expanded upon below, with reference to FIG. 4. In this specific example, Web-server 222 is shown with a "Networks" 223 label, West_center 224 is shown with a "Networks Group" 225 label, and Westbrook Kevin 226 is shown with a "User" 227 label.

The administrator is able to select one of the three choices listed in the over-lay menu 220 menu. Alternatively, the administrator is able to keep typing in the user entry field 130. Either way, the administrator completes, in the present example, the entry, "Allow access to web-server".

In FIG. 3 the administrator has completed entering the rule in the user entry field 130 of the GUI 100. As soon as the word, "web-server" is complete, it too is underlined, indicating that "web-server" is a recognized keyword of the NGFW. Additionally, the prefix "nw:" 310 automatically appears before the underlined word "web-server". The prefix "nw:" 310 indicates that "web-server" is recognized as a keyword corresponding to a network.

As an alternative, if the administrator were to type: "Allow access to nw:" in the user entry field 130, an over-lay menu would appear with a list of networks known to the NGFW databases. A non-limiting list of other exemplary abbreviations and their translations which the user might be able to type are provided in Table 1, below:

TABLE 1

| Abbreviation | Translation |
| --- | --- |
| nw: | Network |
| prt: | Port |
| zn: | Zone |
| usr: | User |
| app: | Application |
| urlcat: | URL category |

One advantage of embodiments disclosed herein is that the use of these and other abbreviations, as well as underlining of keywords which are recognized by databases of the NGFW enables the administrator to learn a syntax to quickly enter new rules into the user entry field 130. Additionally, an administrator would naturally tend to use words such as "to", "from", "and", and "or" in an entry in the user entry field 130, and accordingly, these would also be key words known to the GUI 100.

Figure 4:
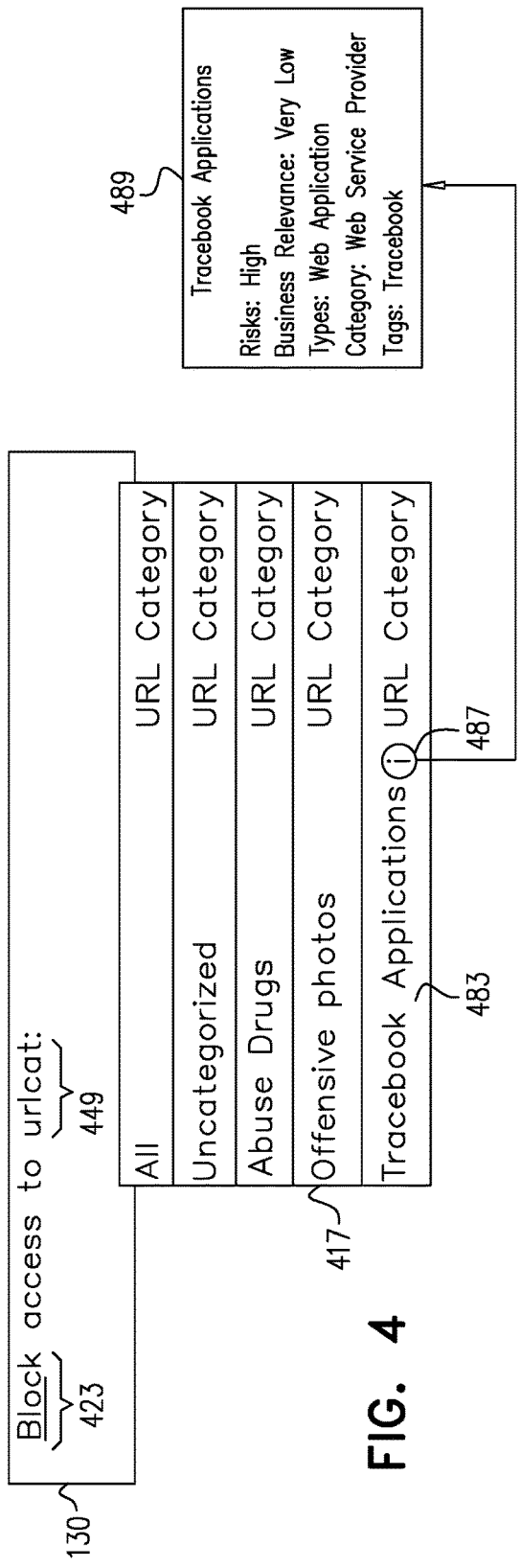
FIG. 4 is a second example of an over-lay menu which may appear when the administrator enters a rule in the user entry field of FIG. 1A.

Turning briefly to FIG. 4, which is a second example of an over-lay menu 417, which may appear when the administrator enters a rule in the user entry field 130. In the present example, the user has entered a rule: "Block access to urlcat:". The word, "Block" 423 appears underlined, as does the word, "Allow" in FIG. 2, as the GUI 100 recognizes "Block" 423 as a known keyword for an action to be performed by the NGFW. The over-lay menu 417 appears when the administrator enters the abbreviation "urlcat:".

Various known URL categories, such as All, Uncategorized, Abuse Drugs, Offensive Photos, etc. appear in a list. The administrator may select the desired URL category to block in order to complete the rule. The over-lay menu 417 may also provide an information icon that the administrator may click, revealing a window with information about a menu item. For example, a menu item "Tracebook Applications" 483 has, an information icon 487, an i in a circle (i), which when selected might open up an information window 489, which may provide the information below, in Table 2:

TABLE 2

Tracebook Applications

| | |
|---|---|
| Risks | High |
| Business Relevance | Very Low |
| Types | Web Application |
| Category | Web Service Provider |
| Tags | Tracebook |

Accordingly, if the user wishes to know more about a particular menu item, clicking the information icon 487 allows the user to learn more. The user may decide to tailor a particular rule for a particular menu item entry on the basis the available information from the information window 489. The information may be provided by a threat intelligence provider.

Figure 5:
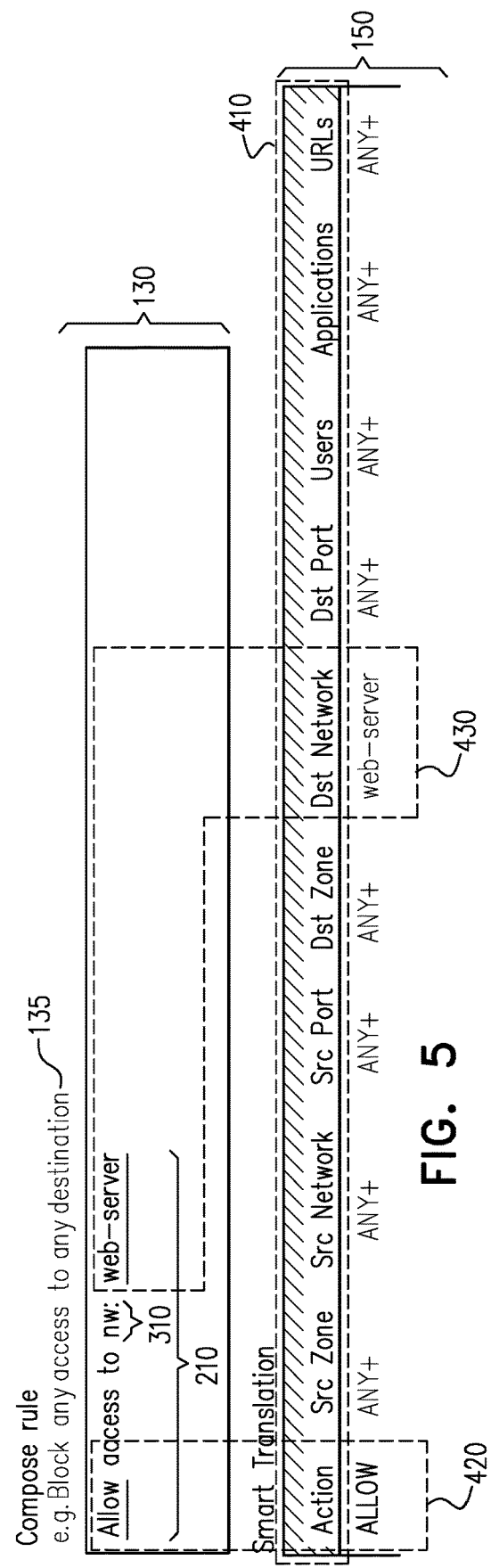
FIG. 5 is an illustration of a relation between the user entry field and a tabular view of the GUI of the NGFW of FIG. 1A in accordance with various implementations.

Reference is now made to FIG. 5, which is simplified pictorial illustration showing a relation between the user entry field 130 and the tabular view 150 of the GUI 100 of the NGFW of FIG. 1A. The tabular view 150 displays various fields 410 for which a rule for the NGFW might involve. Table 3 briefly summarizes the various fields:

TABLE 3

| Field | Explanation |
|---|---|
| Action | As mentioned above, e.g., Allow, Permit, Block, Deny, Authorize, Enable, etc. |
| Src Zone | A source security zone inside of the NGFW from which originating traffic is affected by the rule |
| Src Network | A source network inside of the NGFW from which originating traffic is affected by the rule |
| Src Port | A source port zone inside of the NGFW from which originating traffic is affected by the rule |
| Dst Zone | A target security zone outside of the NGFW to which destination traffic is affected by the rule |
| Dst Network | A target network outside of the NGFW to which destination traffic is affected by the rule |
| Dst Port | A target port zone outside of the NGFW to which destination traffic is affected by the rule |
| Users | Any users to which the rule applies (the rule for users may be applicable regardless of whether traffic is inbound or outbound) |
| Applications | Any application to which the rule applies (the rule for application may be applicable regardless of whether traffic is inbound or outbound) |
| URLs | Any URL to which the rule applies (the rule for URL may be applicable regardless of whether traffic is inbound or outbound) |

By way of example, user Jane Smith, due to particular requirements of her job, may require access to a website which is blocked for other users. A rule might be created allowing user Jane Smith to access a website www.badnews.com. Similarly, access to a particular website may be allowed only from one browser, but not from another. In such a case, a rule might be created to "Block application Browser2 to www.badnews.com". A second rule might be created to "Allow application Browser1 to www.badnews.com".

Returning to the discussion of the relation between the user entry field 130 and the tabular view 150 shown in FIG. 5, the verb "Allow" of the rule "Allow access to web-server" 210 appearing in the user entry field 130 also appears in the tabular view 150. A first box 420 surrounds the word "Allow" in both the user entry field 130 and the Action field of the tabular view 150. Similarly, a second box 430 surrounds the term "web-server" in both the user entry field 130 and the Dst Network (destination network) field of the tabular view 150.

Once the rule is created and user moves focus from the input field or presses the enter key (as was mentioned above), the graphical view 160 (FIG. 1A) is populated with the result of the smart translation in the GUI 100, as shown in FIG. 1.

Figure 6:
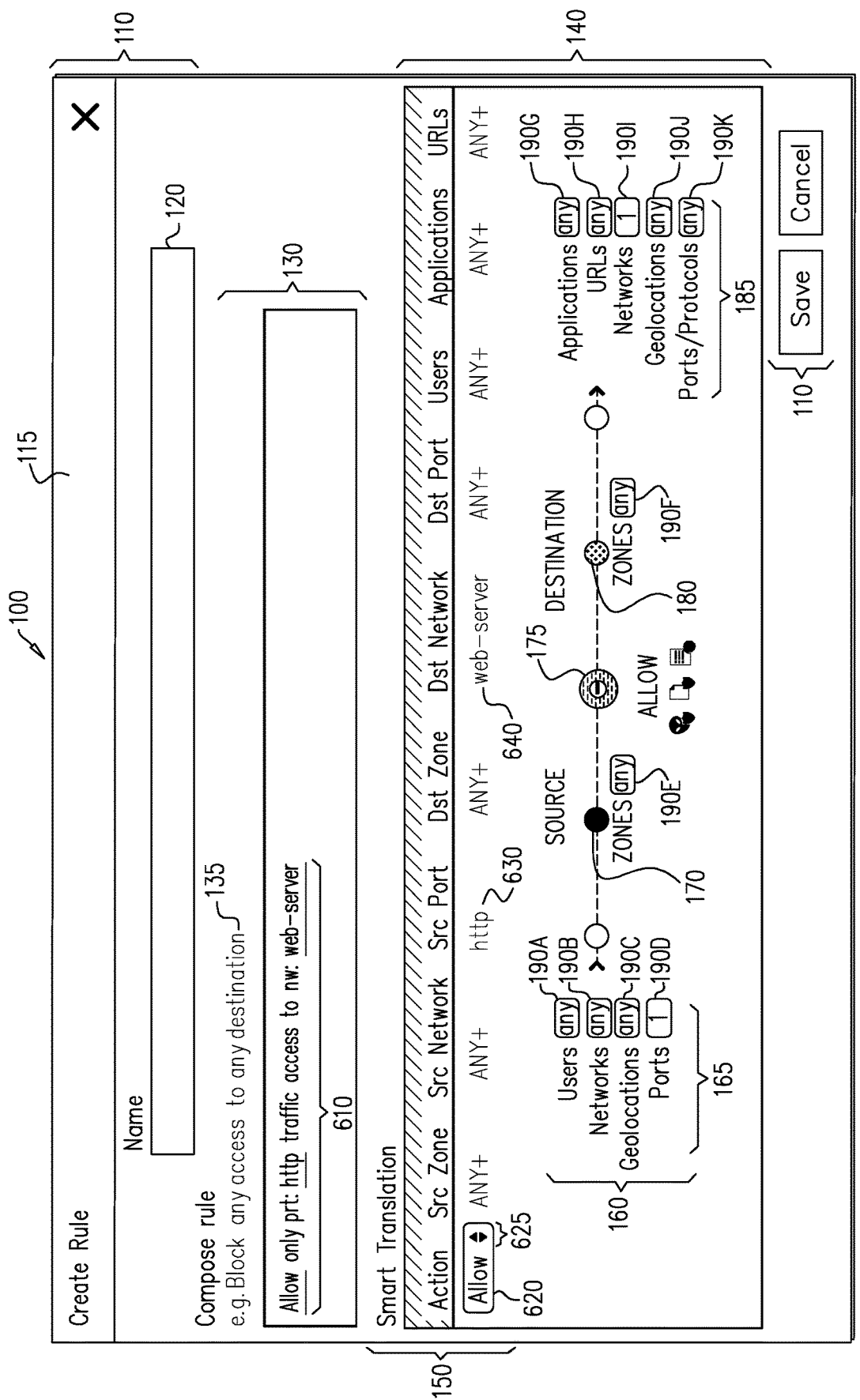
FIG. 6 is an illustration of another example of use of the GUI of FIG. 1A in accordance with various implementations.

FIG. 6 is a simplified pictorial illustration of another example of use of the GUI 100 of FIG. 1A. The GUI 100 in the present (and in following) example is depicted comprising the same portions as in FIG. 1A, namely, the administrative portion 110, including the window title bar 115, the Name field 120, as well as the Save and Cancel buttons. The user entry field 130 now displays a different exemplary rule, in this case, "Allow only prt: http traffic to access nw: web-server". That is to say, "Only traffic originating from an HTTP port inside the NGFW is allowed to access to the external web-server network". Persons of skill in the art will appreciate that HTTP is a so-called "well-known Transmission Control Protocol (TCP) port" that is assigned in a standard in a range from port 0 to port 1023 (e.g., HTTP is assigned port 80). For other TCP protocols with well-known ports, or so called registered ports (having a port number in the range of 1024-49151), protocol names may be used in either or both of the Src Port or the Dst Port fields in the user entry field 130 and correspondingly, will appear in the tabular view 150. Alternatively, the port number (e.g. 80 for HTTP) may be used for any of well-known or registered ports and for non-standard protocols, having a port number greater than 49151.

The tabular view 150 is correspondingly populated to match the rule entered in the user entry field 130. In the present example, the Action column is populated with the verb, Allow 620. Arrows 625 next to the entry Allow 620 in the Action column appear, indicating that the administrator may edit the rule to change the action (for example, from Allow to Block), by scrolling through a list of actions which may appear in the Action column of the tabular view 150. In general, the tabular view 150 may be used by the administrator in order to edit the rule. Changes made in the tabular view 150 will then be reflected in the user entry field 130 and the graphical view 160.

Similarly, the tabular view 150 displays the Src Port as http 630, and the destination network as web-server 640. The graphical view 160 reflects a limitation of the rule in the user entry field 130 to a single port (HTTP, port 80, as noted above). Accordingly, while the various elements 165 showing Users, Networks, and Geolocations are accompanied by the legend 190A-190C "any", the Port for the rule is shown as limited to one (1) port in the legend 190D. Similarly, while the list of allowed elements 185 shows that the Applications, URLs, Geolocations, and Ports/Protocols for the destination are shown as "any" in legends 190G-H and 190J-K, only one (1) allowed network (i.e. web-server) is indicated by legend 190I.

Figure 7:
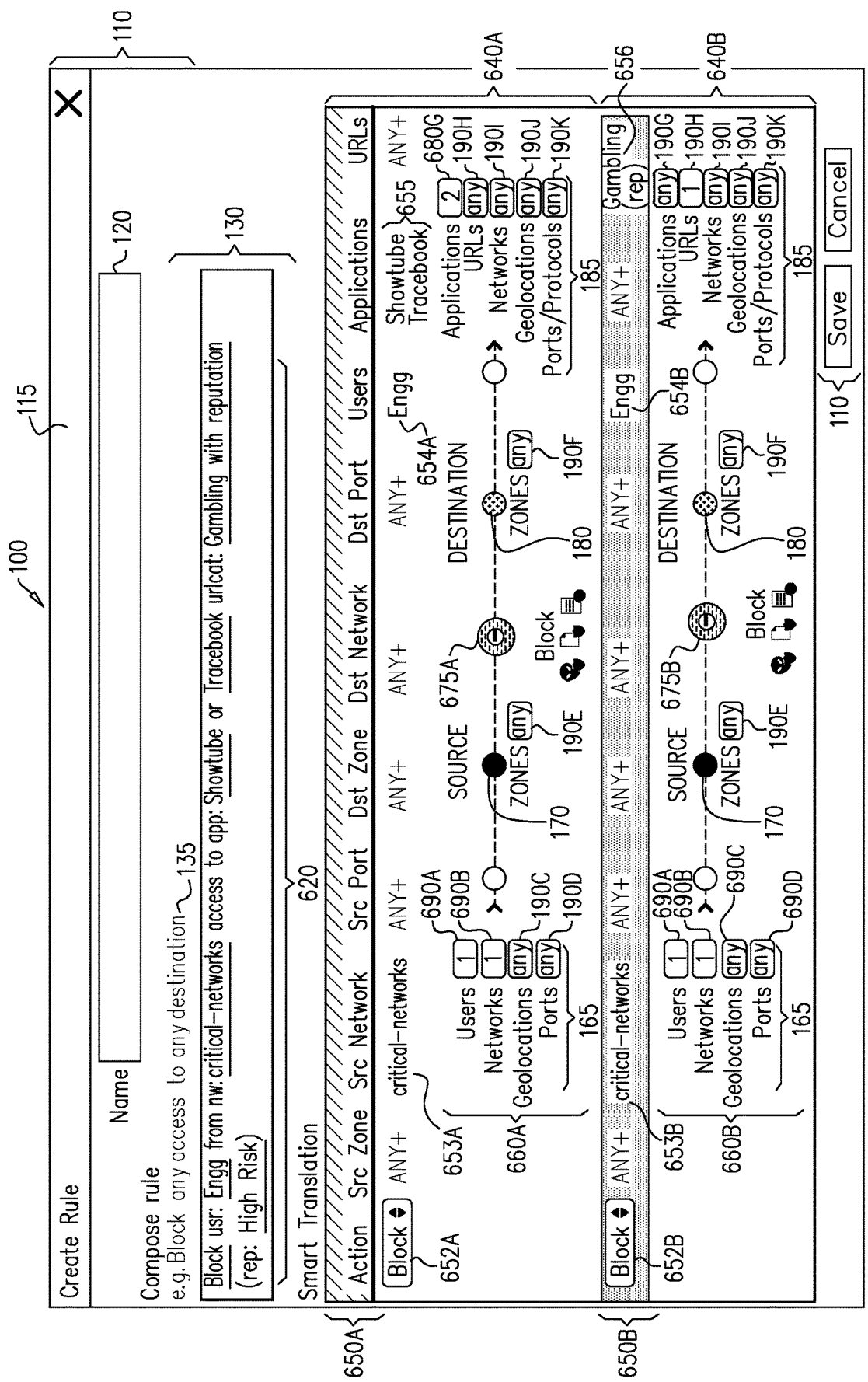
FIG. 7 is an illustration of still another example of use of the GUI of FIG. 1A in accordance with various implementations.

FIG. 7 is a simplified pictorial illustration of still another example of use of the GUI 100 of FIG. 1A. The GUI 100 in the present example is depicted comprising the same portions as in FIG. 1A, namely, the administrative portion 110, including the window title bar 115 and the Name field 120, as well as the Save and Cancel buttons. The user entry field 130 now displays a different exemplary rule, in this case, a complex rule 720: "Block usr: Engg from nw: critical-networks access to app: Showtube or Tracebook urlcat: Gambling with reputation (rep: High Risk)". That is to say, "Block traffic originating with the user Engg (i.e. the user whose user name is "Engg") on the critical-networks network from accessing any of Showtube or Tracebook (Applications), and any URL which has a reputation as being a high risk gambling web site. Reputation of a URL may be provided by the threat intelligence provider, such as Cisco Talos, as mentioned above. Because of the Boolean logic involved: (e.g., [(Showtube OR Tracebook) AND any high risk gaming site]), two distinct Smart Translation portions 640A, 640B appear. The two distinct Smart Translation portions 640A, 640B both comprise a tabular view 650A, 650B, and a graphical view 660A, 660B. The "block" action of the rule 720 is reflected in the tabular views 650A, 650B in their Action field, which has the value "Block" 652A, 652B. The graphical views 660A, 660B both also have a graphical element 675A, 675B, indicating that traffic from inside the NGFW is blocked.

Similarly, the "nw: critical-networks" portion of the rule 720 is reflected in the tabular views 650A, 650B in their Src Network field, which has the value "critical-networks" 653A, 653B. A legend 690B "1" indicates in the graphical views 660A, 660B that one network (e.g., "critical networks") is affected by the rule 720.

Likewise, the "usr: Engg" portion of the rule 720 is reflected in the tabular views 650A, 650B in their Users field, both of which have the value "Engg" 654A, 654B. A legend 690A "1" indicates in the graphical views 660A, 660B that one user (e.g., "Engg") is affected by the rule 720.

The final portion of rule 720, "app: Showtube or Tracebook urlcat: Gambling with reputation (rep: High Risk)", has the Boolean OR which causes the two distinct Smart Translation portions 640A, 640B to be displayed. That is to say, that both Tracebook or Showtube is to be blocked to user Engg from inside the critical-networks network, even if no high risk gambling URL is involved, and likewise, any high risk gambling URL is blocked to user Engg from inside the critical-networks network, even if neither Tracebook nor Showtube are involved. In order to properly express the rule 720 properly, two distinct Smart Translation portions 640A, 640B are invoked.

A first of the two distinct Smart Translation portions 640A reflects the portion of rule 720, which was stated above as "either Tracebook OR Showtube is to be blocked to user Engg from inside the critical-networks network, even if no high risk gambling URL is involved". The applications column of the tabular view 650A is populated with both "Showtube and Tracebook" 655. Legend 680G "2" indicates that two applications (e.g., Showtube and Tracebook) are blocked.

A second of the two distinct Smart Translation portions 640B reflects the portion of rule 720, which was stated above as "any high risk gambling URL is blocked to user Engg from inside the critical-networks network, even if neither Tracebook nor Showtube are involved". The URLs column of the tabular view 650B is populated with "Gambling (rep)" 656. In some embodiments, hovering of a cursor over the "(rep)" in the text "Gambling (rep)" 656 on the GUI 100 will yield a display box showing "High Risk).

Graphical elements not explained in the graphical views 660A, 660B correspond to their respective similar graphical element in FIG. 1A.

Figure 8:
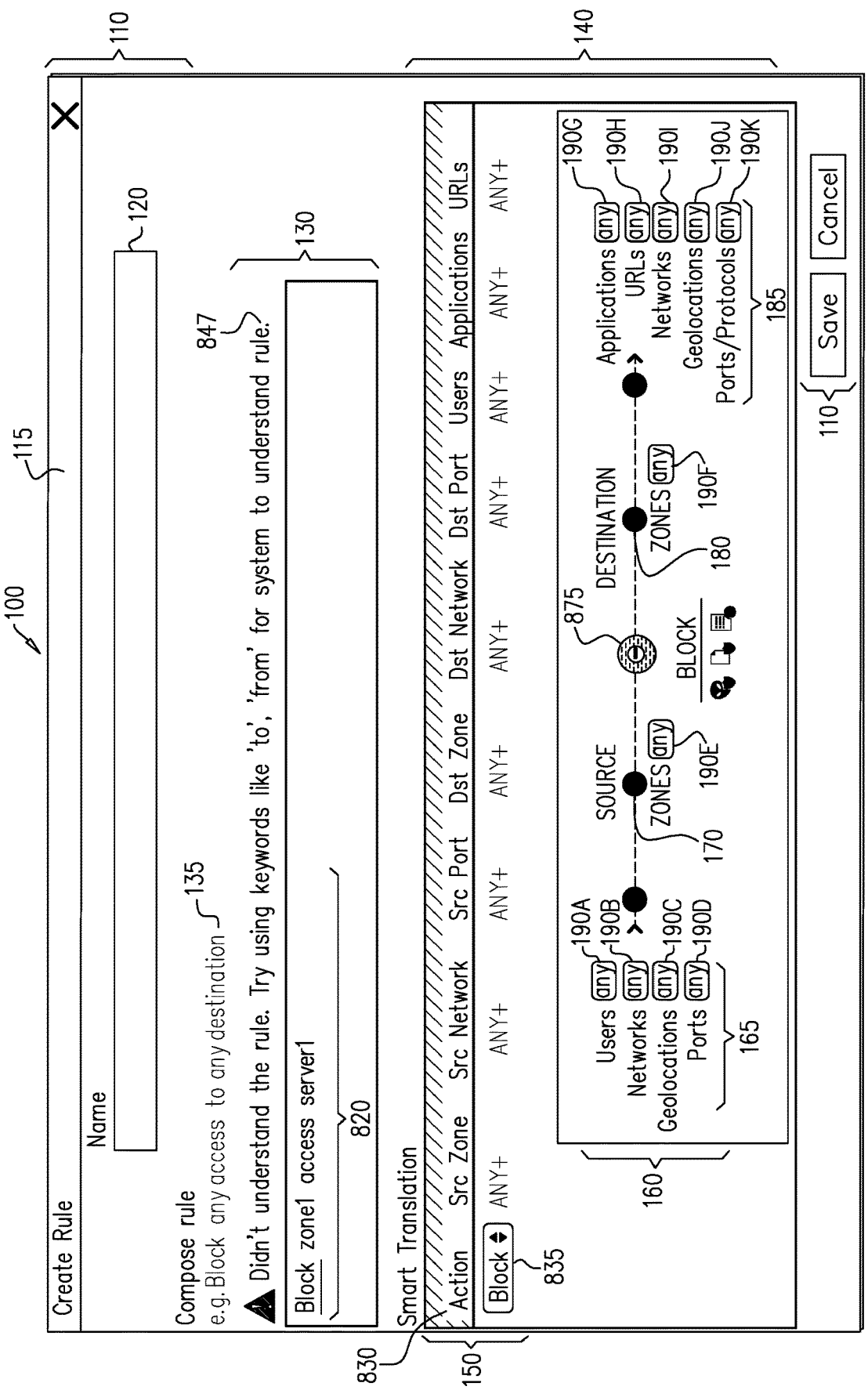
FIG. 8 is an illustration of yet another example of use of the GUI of FIG. 1A in accordance with various implementations.

Reference is now made to FIG. 8 which is a simplified pictorial illustration of yet another example of use of the GUI 100 of FIG. 1A. FIG. 8 depicts an error of a rule 820 that the GUI 100 is unable to parse. In the example of FIG. 8, the administrator has entered the rule "Block zone1 access server1" 820 in the user entry field 130. The rule "Block zone1 access server1" 820 is ambiguous. As the rule "Block zone1 access server1" 820 is presented, at least two contradictory interpretations are possible:

Block zone1 access to server1

Block zone1 access from server1

Since the GUI 100 is unable to parse the rule "Block zone1 access server1" 820, an error message 847 "Didn't understand the rule. Try using keywords like 'to', 'from' for system to understand rule" is displayed. Other error messages may appear as appropriate in accordance with the nature of the error in the rule which was entered in the user entry field 130, and the ability of the GUI 100 to parse the rule.

It is also appreciated that there may be additional problems with the rule, "Block zone1 access server1" 820. For example, zone1 may not be a known entity (presumably one of a source zone or a destination zone) to the NGFW databases.

Since the action "Block" is recognized by the GUI 100, the action field 830 of the tabular view 150 indicates the action "Block" 835. Correspondingly, a graphical element 875 in the graphical view 160 indicates that traffic from inside the NGFW is to be blocked.

Figure 9:
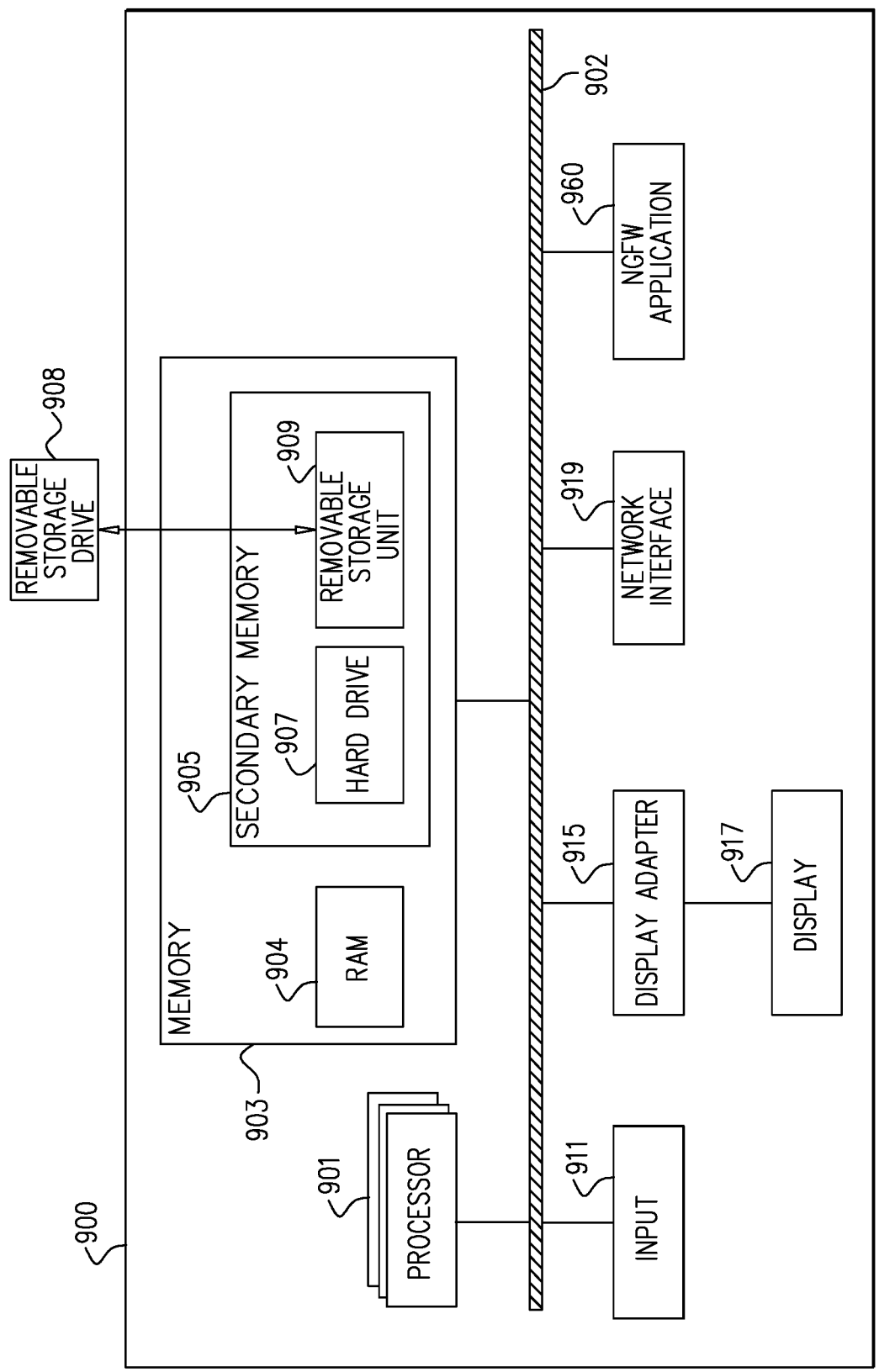
FIG. 9 is a block diagram representation of a device comprising an NGFW and operative to display the GUI of FIG. 1A in accordance with various implementations.

FIG. 9 is a block diagram of an exemplary device comprising an NGFW and operative to display the GUI 100 of FIG. 1A.

The exemplary device 900 is suitable for implementing any of the systems, methods or processes described above. The exemplary device 900 comprises one or more processors, such as processors 901, providing an execution platform for executing machine readable instructions such as software. One of the processors 901 may be a special purpose processor operative to the NGFW and/or the GUI 100 of FIG. 1A described herein above. Processors 901 comprise dedicated hardware logic circuits, in the form of an application-specific integrated circuit (ASIC), field programmable gate array (FPGA), or full-custom integrated circuit, or a combination of such devices. Alternatively or additionally, some or all of the functions of the processors 901 may be carried out by a programmable processor microprocessor or digital signal processor (DSP), under the control of suitable software. This software may be downloaded to the processor in electronic form, over a network, for example. Alternatively or additionally, the software may be stored on tangible storage media, such as optical, magnetic, or electronic memory media.

Commands and data from the processors 901 are communicated over a communication bus 902. The exemplary device 900 also includes a non-transitory memory 903, which may further include a Random Access Memory (RAM) 904, which functions as a main memory, where machine readable instructions may reside during runtime, and a secondary non-transitory memory 905. The secondary non-transitory memory 905 may include, for example, a hard disk drive 907 and/or a removable storage drive 908, representing a floppy diskette drive, a magnetic tape drive, a compact disk drive, a flash drive, etc., or a nonvolatile memory where a copy of the machine readable instructions or software may be stored. The secondary non-transitory memory 905 may also include ROM (read only memory), EPROM (erasable, programmable ROM), EEPROM (electrically erasable, programmable ROM). In addition to databases, tables, and other information for operation of the NGFW discussed herein throughout, and without limiting the generality of the foregoing, or other similar data, may be stored in the memory 903 and/or the secondary non-transitory memory 905. The removable storage drive 908 reads from and/or writes to a removable storage unit 909 in a well-known manner.

The administrator can interface with the exemplary device 900 via a user GUI (including graphical user interface (GUI) 100 of FIG. 1A) in order to provide user input data. A display adaptor 915 interfaces with the communication bus 902 and a display 917 and receives display data from the processors 901 and converts the display data into display commands for the display 917. The display adapter 915 might include a graphics engine operative to display the GUI 100 of FIG. 1A, as described herein.

A network interface 919 is provided for communicating with other systems and devices via a network. The network interface 919 typically includes a wireless interface for communicating with wireless devices in the wireless community. A wired network interface (e.g. an Ethernet interface) may be present as well. The exemplary device 900 may also comprise other interfaces, including, but not limited to Bluetooth, and HDMI.

A NGFW 960, the use of which is described above, may be among the software and/or specialized hardware executed or controlled by the processors 901.

A translation engine (not depicted) might be invoked by the processors 901 in order to convert text entered into the GUI 100 of FIG. 1A into an element in one or more of the databases of the NGFW. For instance, (referring back to FIG. 1A, briefly) the translation engine might parse the text entered as the rule in the user entry field 130, "Allow access to nw: web-server" and determine that the network web-server is known in the NGFW databases as a network. The translation engine might then populate the fields in the GUI 100 as referring to the web-server network.

It will be apparent to one of ordinary skill in the art that one or more of the components of the exemplary device 900 may not be included and/or other components may be added as is known in the art. The exemplary device 900 shown in FIG. 9 is provided as an example of a possible platform that may be used, and other types of platforms may be used as is known in the art.

Figure 10:
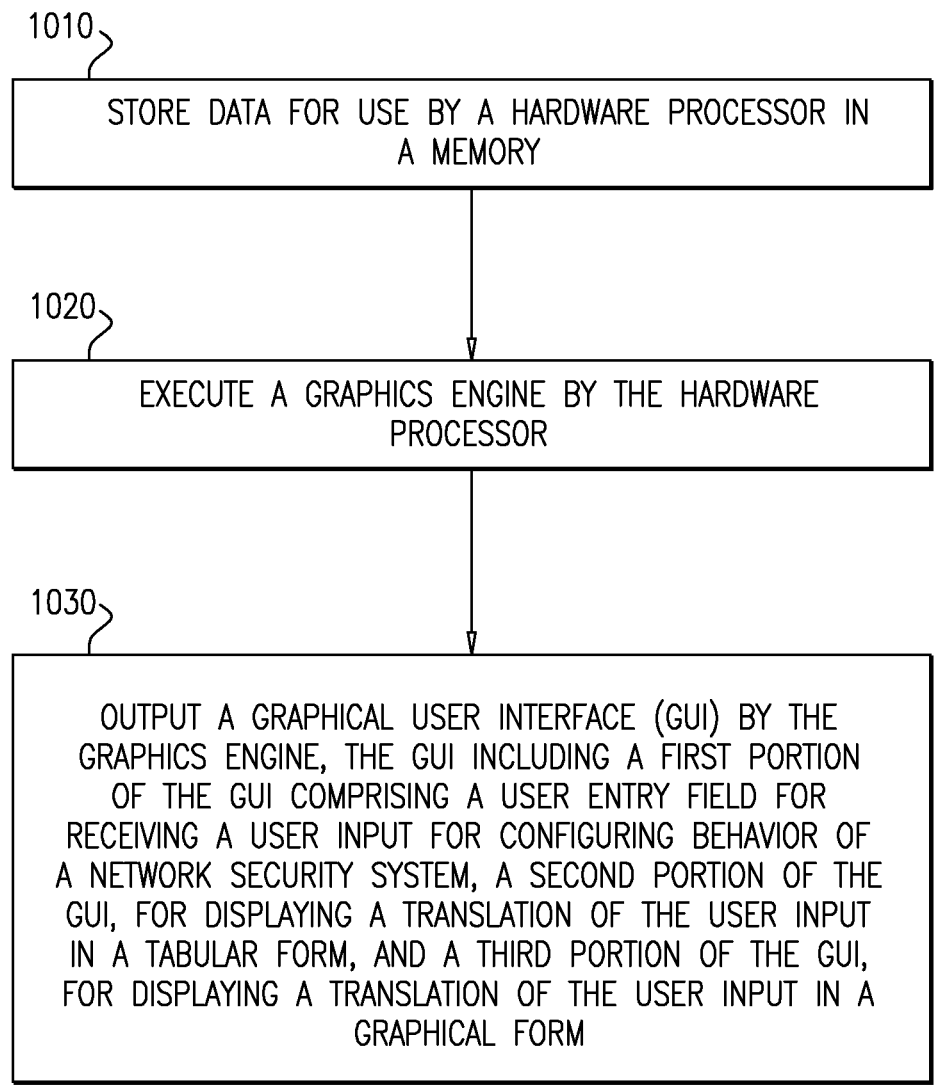
FIG. 10 is a flowchart representation of aspects of a method of operation of the GUI of FIG. 1A in accordance with various implementations.

FIG. 10 is a simplified flow chart 1000 diagram of a method for an embodiment of operation of the GUI 100 of FIG. 1A. Reference is also additionally made to FIGS. 1 and 9. In step 1010 data is stored for use by a hardware processor, such as one or more of the processors 901 in a memory, which may be included in the main memory 903 and/or the secondary non-transitory memory 905. In step 1020 a graphics engine, which might be a portion of the NGFW application 960 is executed by the hardware processor.

A GUI 100, is output by the graphics engine, in step (1030), for example, to the display adapter 915, for displaying on the display 917. The GUI 100 includes a first portion comprising a user entry field, such as a user entry field (e.g., the user entry field 130), for receiving a user input (e.g., the user input 911) for configuring behavior of a network security system. The GUI 100 includes a second portion for displaying a translation of the user input in a tabular form, such as the tabular view 150. The GUI 100 includes a third portion for displaying a translation of the user input in a graphical form, such as the graphical view 160.

It is appreciated that software components of the present disclosure may, if desired, be implemented in read only memory (ROM) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It is appreciated that various features of the embodiments which are, for clarity, described in the contexts of separate embodiments may also be provided in combination in a single embodiment. Conversely, various features of the embodiments which are, for brevity, described in the context of a single embodiment may also be provided separately or in any suitable subcombination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method of displaying on a display a graphical user interface (GUI) for a network security system or application, the method comprising:
   first receiving, in a user entry field, natural language user textual input for configuring one or more operations of the network security system or application, the input including an alternative selection between a first network option and a second network option; and
   selecting keywords from the natural language user textual input that correspond to any of a set of network parameters;
   displaying simultaneously;
      a first table with a first header of the set of network parameters and the selected keywords relative to the corresponding displayed set of network parameters, the displayed selecting keywords including the first network option but not the second network option;
      a first graphical form of the natural language user textual input, the first graphical form being based on the first network option but not the second network option;
      a second table with a second header of the set of network parameters and the selected keywords relative to the corresponding displayed set of network parameters, the displayed selecting keywords including the second network option but not the first network option; and
      a second graphical form of the natural language user textual input, the second graphical form being based on the second network option but not the first network option.

2. The method according to claim 1, the operations further comprising:
   second receiving and edit to the selected keywords of the first table; and
   changing, in response to the second receiving, the natural language user textual input and the first graphical form.

3. The method of claim 1 and further comprising displaying suggestions based on partial user inputs to aid in completing the natural language user textual input.

4. The method of claim 1 wherein the natural language user textual input describes network elements inside a firewall.

5. The method of claim 4 wherein the natural language user textual input describes firewall actions.

6. The method of claim 1 wherein the natural language user textual input describes network elements outside a firewall.

7. The method of claim 6 wherein the natural language user textual input describes firewall actions.

8. A non-transitory computer readable media storing instructions for displaying on a display a graphical user interface (CUD for a network security system or application, which when executed by a processor cause the processer to perform operations comprising;
   first receiving, in a user entry field, natural language user textual input for configuring one or more operations of the network security system or application, the input including an alternative selection between a first network option and a second network option; and
   selecting keywords from the natural language user textual input that correspond to any of a set of network parameters;
   displaying simultaneously:
      a first table with a first header of the set of network parameters and the selected keywords relative to the corresponding displayed set of network parameters, the displayed selecting keywords including the first network option but not the second network option;
      a first graphical form of the natural language user textual input, the first graphical form being based on the first network option but not the second network option;
      a second table with a second header of the set of network parameters and the selected keywords relative to the corresponding displayed set of network parameters, the displayed selecting keywords including the second network option but not the first network option; and
      a second graphical form of the natural language user textual input, the second graphical form being based on the second network option but not the first network option.

9. The media according to claim 8, the operations further comprising:
   second receiving and edit to the selected keywords of the first table; and
   changing, in response to the second receiving, the natural language user textual input and the first graphical form.

10. The media of claim 8 and further comprising displaying suggestions based on partial user inputs to aid in completing the natural language user textual input.

11. The media of claim 8 wherein the natural language user textual input describes network elements inside a firewall.

12. The media of claim 11 wherein the natural language user textual input describes firewall actions.

13. The media of claim 8 wherein the natural language user textual input describes network elements outside a firewall.

14. The media of claim 13 wherein the natural language user textual input describes firewall actions.

15. A system, comprising:
   a display;
   a memory storing instructions for displaying on the display a graphical user interface (GUI) for a network security system or application;
   a processor programmed to cooperate with the instructions to perform operations comprising:
      first receiving, in a user entry field, natural language user textual input for configuring one or more operations of the network security system or application, the input including an alternative selection between a first network option and a second network option; and
      selecting keywords from the natural language user textual input that correspond to any of a set of network parameters;
      displaying simultaneously on the display:
         a first table with a first header of the set of network parameters and the selected keywords relative to the corresponding displayed set of network parameters, the displayed selecting keywords including the first network option but not the second network option;
         a first graphical form of the natural language user textual input, the first graphical form being based on the first network option but not the second network option;
         a second table with a second header of the set of network parameters and the selected keywords relative to the corresponding displayed set of network parameters, the displayed selecting keywords including the second network option but not the first network option; and
         a second graphical form of the natural language user textual input, the second graphical form being based on the second network option but not the first network option.

16. The media according to claim 15, the operations further comprising:
   second receiving and edit to the selected keywords of the first table; and
   changing, in response to the second receiving, the natural language user textual input and the first graphical form.

17. The media of claim 15 and further comprising displaying suggestions based on partial user inputs to aid in completing the natural language user textual input.

18. The media of claim 15 wherein the natural language user textual input describes network elements inside a firewall.

19. The media of claim 18 wherein the natural language user textual input describes firewall actions.

20. The media of claim 15 wherein the natural language user textual input describes network elements outside a firewall.

* * * * *